Patented Mar. 4, 1952

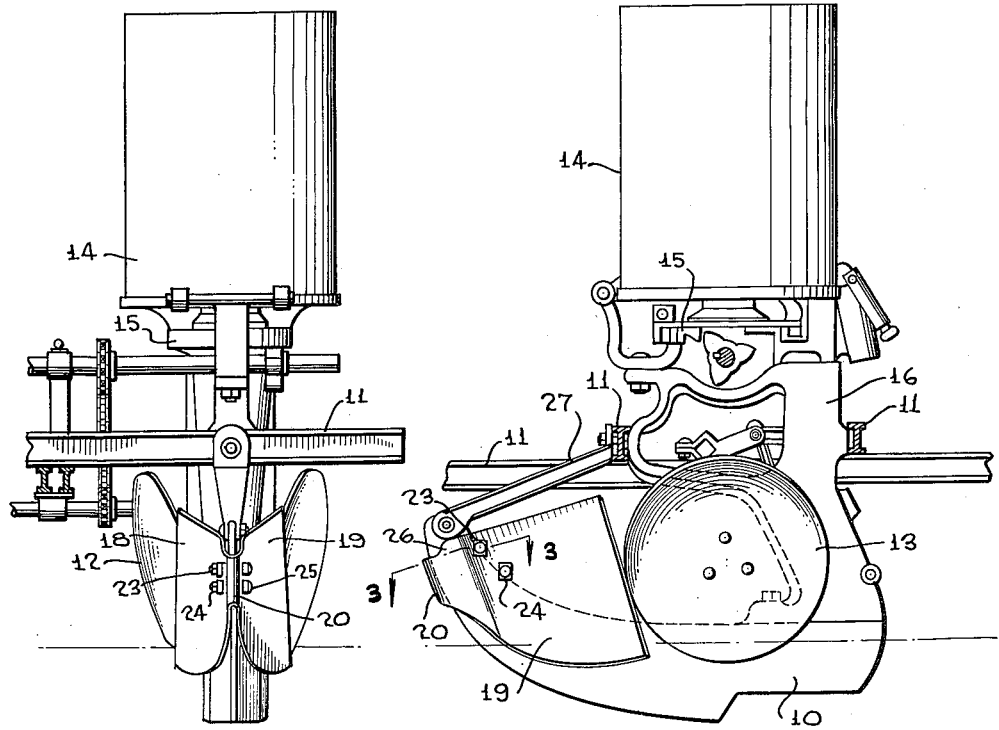

2,587,765

UNITED STATES PATENT OFFICE 2,587,765

AUXILIARY FURROW OPENER

Frederick E. Rohrer, Paola, Kans.

Application September 19, 1950, Serial No. 185,564

1 Claim. (Cl. 97—225)

This invention relates to auxiliary furrow openers for seed planters and more particularly to an auxiliary furrow opener for a runner equipped planter such as a corn or cotton seed planter.

It is among the objects of the invention to provide an improved auxiliary furrow opener which can be mounted on the front end of the runner of a runner equipped seed planter to move clods, dry earth and trash away from the runner and permit the runner to open a furrow to the proper depth in the fine, moist earth, just below the surface, which can be quickly and easily mounted on an existing planter with no modification of the planter construction, which operates effectively at both sides of the runner, produces no side thrust on the runner and does not interfere with the furrow opening operation of the runner, and which is simple and durable in construction, economical to manufacture, easy to install and remove, and positive and effective in operation.

Other objects and advantages will become apparent from a consideration of the following description and the appended claim in conjunction with the accompanying drawing wherein:

Figure 1 is a front elevational view of a fragmentary portion of a runner equipped seed planter showing an auxiliary furrow opener illustrative of the invention operatively mounted on the runner of the planter;

Figure 2 is a side elevational view of the fragmentary portion of the planter and of the auxiliary furrow opener illustrated in Figure 1;

Figure 3 is a longitudinal cross sectional view of the furrow opener taken on the line 3—3 of Figure 2; and Figure 4 is a top plan view of the auxiliary furrow opener.

With continued reference to the drawing, the fragmentary portion of the planter illustrated includes a runner 10 having an outwardly and forwardly curved bottom edge and tapering in thickness from its rear to its front end. The runner is carried on the machine frame 11 for vertical movement relative to the frame so that the runner can be raised for transportation of the machine and can be lowered to engage in the ground for providing a seed receiving furrow in the ground. Furrow opening discs 12 and 13 are mounted on the runner at respectively opposite sides thereof and a seed hopper 14 is supported on the top of the runner and provided with feed mechanism 15 connected to the bottom edge of the runner through the hollow stem structure 16.

As the planter is of well known construction, a more detailed illustration and description thereof is considered unnecessary for the purposes of the present disclosure.

The auxiliary furrow opener is generally indicated at 17 and comprises two plates 18 and 19 of generally quadrant shape disposed in side by side relationship and provided by a single piece of metal bent at its mid-length location to a U-shaped formation.

Adjacent the juncture 20 therebetween the portions of the two plates 18 and 19 are substantially parallel and spaced apart to receive the front end portion of the runner therebetween. At a location spaced from this juncture a distance substantially equal to the width of the front end portion of the runner the plates 18 and 10 are bent outwardly, away from each other, and diverge symmetrically from this location to the edges of the plates remote from the juncture between the plates, as is clearly illustrated in Figure 4. The plates also diverge from their upper to their lower edges so that the lower rear corners of the plates are spaced apart a distance somewhat greater than the upper rear corners to roll objects, such as clods or stones, away from the furrow.

Adjacent the location at which the plates are bent outwardly each plate is provided with elongated apertures, as indicated at 21 and 22, so located that each of the apertures in one plate registers with a corresponding aperture in the other plate and bolts 23 and 24 extend through these apertures to secure the device on the runner of the planter. Wedge shaped washers 25 are placed under the heads and nuts of the bolts 23 and 24 to compensate for the relative inclination of the corresponding portions of the plates 18 and 19 and the apertures are so located that the bolts rest upon the upper or inner edge of the runner, as is clearly illustrated in Figure 2, so that the front end portion of the runner is disposed between the bend or juncture 20 and the bolts 23 and 24.

The plates are recessed at the upper front corner of the device, as indicated at 26, to receive the front end of the strut 27 which connects the front end of the runner 10 to the frame structure of the planter and the lower rear corner of the device is disposed above the bottom edge of the runner so that the runner can operate in the ground a distance considerably below the bottom edge of the auxiliary furrow opening device.

When the device is operatively mounted on the runner the two plates 18 and 19 are disposed at respectively opposite sides of the runner and diverge rearwardly from the front end of the runner symmetrically of the runner so that they will move the earth in respectively opposite directions away from the runner and impose no side thrust on the runner.

Most seed planters of the character indicated are provided with two runners spaced apart to provide a desired spacing between adjacent rows of a row crop and two auxiliary furrow openings or opening devices are provided, mounted one on each runner in the manner indicated above.

The device can be mounted on a runner by simply placing the front end portion of the runner between the parallel portions of the two plates 18 and 19, inserting the bolts through the corresponding apertures in the plates and threading the nuts onto the bolts, and can be removed from the runner by an obvious reversal of this operation.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claim are, therefore, intended to be embraced therein.

What is claimed is:

An auxiliary furrow opener for a runner equipped seed planter comprising quadrant shaped plates arranged in superposed relationship with their edges substantially in alignment, said plates being joined together at one end of the curved edges thereof and with the adjacent portions of said plates spaced apart to receive the front end portion of a runner therebetween, said plates having registering apertures therein spaced from the juncture therebetween, and a bolt extending through said apertures in position to bear on the adjacent edge of a runner received between the portions of said plates adjacent the juncture therebetween, said plates diverging rearwardly and downwardly from the respectively opposite sides of a runner on which said auxiliary furrow opener is mounted and the curved edges of said plates constituting the bottom edge of said auxiliary furrow opener.

FREDERICK E. ROHRER.

REFERENCES CITED

The following references are of record in the file of this patent:

UNITED STATES PATENTS

| Number | Name | Date |
|--------|------|------|
| 421,510 | Perine | Feb. 18, 1890 |
| 539,282 | Matsler | May 14, 1895 |
| 626,672 | Coulthard | June 13, 1899 |
| 907,440 | Baughman | Dec. 22, 1908 |
| 932,275 | Hartzler | Aug. 24, 1909 |
| 998,060 | Weikert | July 18, 1911 |
| 1,018,105 | Flowers | Feb. 20, 1912 |